United States Patent [19]

Braddock

[11] 4,246,251

[45] Jan. 20, 1981

[54] METHOD OF PRODUCING CARBON BLACK

[75] Inventor: Charles E. Braddock, Burleson, Tex.

[73] Assignee: Sid Richardson Carbon & Gasoline Company, Fort Worth, Tex.

[21] Appl. No.: 32,348

[22] Filed: Apr. 23, 1979

[51] Int. Cl.³ .................. C09C 1/50; C09C 1/56; C09C 1/58

[52] U.S. Cl. .................. 423/450; 106/307; 423/445; 423/460

[58] Field of Search .......... 423/450, 455, 456, 460, 423/461; 106/307; 23/314; 422/150

[56] References Cited

U.S. PATENT DOCUMENTS

| | | | |
|---|---|---|---|
| 2,283,364 | 5/1942 | Hanson et al. | 23/314 |
| 2,686,107 | 8/1954 | Jordan | 23/314 |
| 3,306,761 | 2/1967 | Johnson | 423/460 X |
| 3,411,928 | 11/1968 | Dollinger et al. | 106/307 |
| 3,870,785 | 3/1975 | Henderson | 423/460 |
| 4,138,471 | 2/1979 | Lamond et al. | 423/460 |

Primary Examiner—Edward J. Meros
Attorney, Agent, or Firm—Vinson & Elkins

[57] ABSTRACT

A method of producing carbon black including the steps of burning hydrocarbon fuel, introducing a hydrocarbon feedstock into the combustion gases, quenching the carbon black and gases formed, pelletizing the carbon black with water, drying the pellets with a purge gas and injecting a controlled amount of an oxidant gas into the substantially dry pellets to reduce their modulus-producing properties without reducing their abrasive resistance producing properties and the apparatus therefore.

6 Claims, 2 Drawing Figures

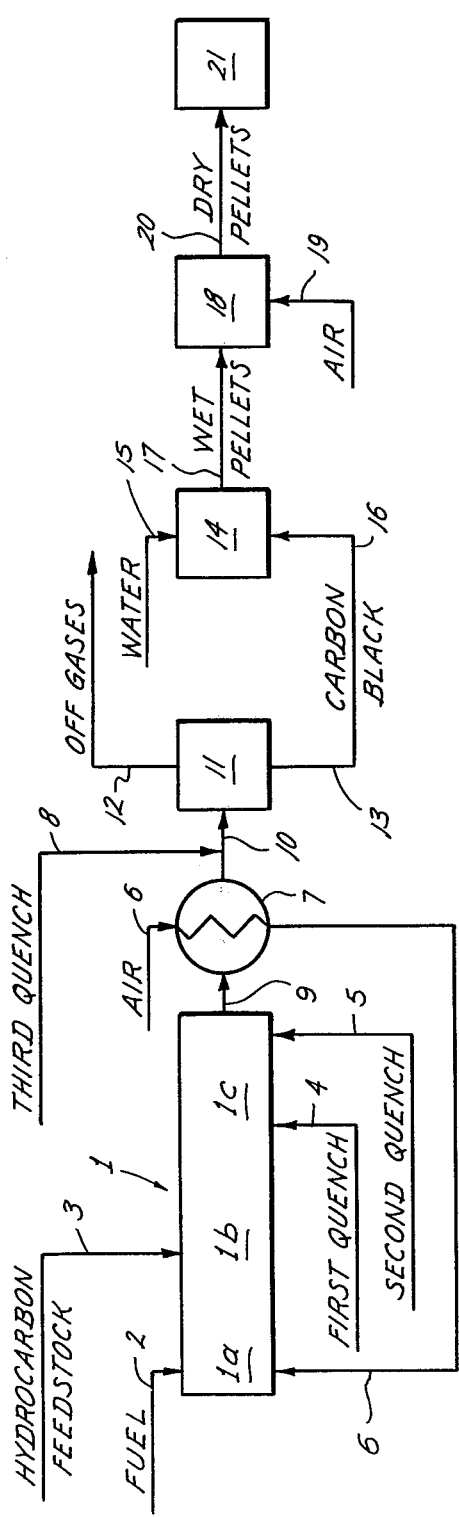
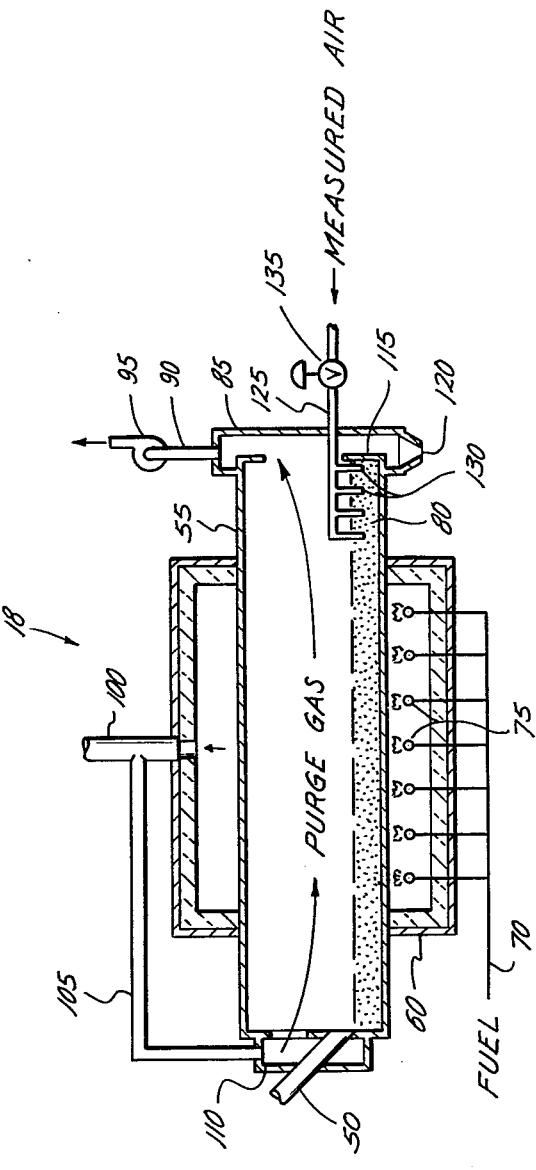

METHOD OF PRODUCING CARBON BLACK

BACKGROUND OF THE INVENTION

This invention relates to the production of carbon black which is pelletized with water and dried before use. A specific aspect of this invention is the improved control of the properties of carbon black which impart stiffness to a rubber compound in which it is used, without the concomitant reduction of the abrasion resistance of the compound.

Rubber is commonly compounded with a quantity of a grade of carbon black as a reinforcing agent. For many uses, the strength or abrasion resistance of the compound, or both, would be inadequate without the carbon black. Carbon black imparts to the compound tensile strength, stiffness, abrasion resistance, and improved extrudability of the uncured material, each to a degree depending upon the properties of the carbon black used.

Stiffness of rubber compounds is commonly measured as the force per unit area of cross section of a compound specimen, prepared under standard conditions, which elongates the specimen by 300% of its original length. This force is designated "300% modulus" in the trade.

While carbon black of one kind or another has been produced since ancient times, most present production of carbon black is carried out in what has come to be known as the furnace processes. In this process a stream of hot gases is generated, usually by burning a hydrocarbon fuel, and a feedstock hydrocarbon is injected into the hot stream of combustion gases, to be converted into a carbon black and product gases. Many variants of the generalized apparatus are known and used commercially, one example of which is disclosed in U.S. Pat. No. 4,106,912.

A large percentage of the carbon black produced by the furnace processes is used to reinforce polymers, particularly rubber used in the manufacture of automotive tires. There are two chief classes of carbon blacks used in making tires, the so-called "soft" blacks used in carcasses of tires where abrasion resistance is not maximized, and the "tread" blacks used in the treads, where maximum abrasion resistance is required, consistent with processability of the stock, acceptable levels of stiffnes or modulus, and extrudability.

Two conspicuous properties of furnace carbon blacks are "surface area" and "structure". Surface area may be measured by adsorptive tests, such as the iodine adsorption test, published by the American Society for Testing and Materials (ASTM) as Method D1510-76. Some estimate of the relative surface area may be obtained by the tint test, in which the ability of the tested black to cover a white pigment is compared to that of a standard carbon black. Such a test is published by the ASTM, as Method D3265-76a. The structure of carbon black refers to its habit of forming, to varying degrees, chains or clumps, which, when viewed in an electron microscope, appear as more or less spheroidal particles fused together. Some structure may appear as fragments of chains of beads grown together; others may suggest clusters of imperfect spheres fused together at the edges. The degree of structure is measured in the industry by the torque on a blade stirring a carbon black while dibutyl phthalate is added, in a standard mixing chamber. The more dibutyl phthalate required to attain a predetermined torque, the greater the degree of structure of the carbon black is deemed to be. This test is published by ASTM as Method D2414-76.

Over a broad spectrum of types of carbon black, the reinforcement of rubber compounds by carbon black increases with its surface area. The abrasion resistance of a compound is thus enhanced in a general way by increased surface area, and to a degree by higher levels of structure. The abrasion resistance imparted to a rubber compound by carbon black at fixed levels of both surface area and structure will vary depending upon the conditions of manufacture of the carbon.

When a tread rubber compound is extruded in the shape suitable for curing in place on the carcass of a tire, the extruded piece must retain dimensional stability and an acceptably regular surface during handling and curing. These properties of the extruded piece depend largely upon the structure level of the carbon black in the compound. Structure also has a major influence upon the modulus of the rubber into which it is compounded; modulus tends to rise rapidly with structure. It is, therefore, necessary at times to provide a level of structure for the control of extrusion properties which may be too high for the level of modulus desired. The manufacturer of carbon black must then use a process which will moderate the development of modulus below the level which would otherwise be attained by the degree of structure required for optimum extrusion properties, yet without any deleterious effects on abrasion resistance.

SUMMARY

The present invention provides an improved method and apparatus for producing carbon black in which the usual furnace is used for burning hydrocarbon fuel, introducing hydrocarbon feedstock into the combustion gases to form carbon black quenching the carbon black, pelletizing the carbon black with water, drying the pellets in a dryer with purge combustion gases flowing therethrough and injecting an oxidant gas, such as air, into the substantially dry pellets in the dryer to reduce their modulus producing properties without reducing their abrasive resistant properties when added to rubber compounds.

An object of this invention is to provide an improved carbon black process and apparatus having means for the lowering of the modulus of rubber compounds containing carbon black without lowering the structure thereof.

Another object of this invention is to provide such means which may be used when required for lowering the modulus producing properties of a carbon black, and removed from service when not required without interrupting the manufacturing process.

Still another object of the invention is to lower the modulus producing properties of carbon black without lowering its ability to impart abrasion esistance to a rubber compound.

BRIEF DESCRIPTION OF THE DRAWINGS

These and other objects and advantages of the present invention are hereinafter set forth and explained with reference to the drawings wherein:

FIG. 1 is a schematic portrayal of a furnace carbon black apparatus presenting essential features and certain optional features.

FIG. 2 is a drawing of apparatus, partly in section, for drying wet carbon black pellets, showing also the preferred embodiments for carrying out the process of this invention.

DESCRIPTION OF THE PREFERRED EMBODIMENT

Carbon black furnace 1, as shown in FIG. 1, has combustion zone 1a, reaction zone 1b and quench zone 1c. These zones are continuous and coaxial as shown. Hydrocarbon fuel for burning is supplied through fuel supply pipe 2 and an air for such burning is supplied through line 6 and is preheated in heat exchange 7 by heat exchanger with the carbon black and hot gases leaving furnace 1 through conduit 9. The hydrocarbon feedstock is introduced into reaction zone 1b through line 3. In zone 1b, feedstock hydrocarbon introduced into the hot gases is decomposed into carbon black and product gases which mingle with the combustion gases to carry the suspended carbon black to the quench zone 1c, at a temperature generally well above 2000° F.

Control of feedstock quality and quantity and its manner of introduction, control of the combustion, and of the conditions in the reaction zone determine the structure and surface area of the carbon black. Certain other qualities of carbon black which have a substantial influence on the properties of the rubber compounds into which it is incorporated are determined by the manner of quenching. It is possible to introduce enough quenching water through first quench pipe 4, generally through a plurality of nozzles (not shown) to decrease the temperature to a level permitting its entry to collection chamber 11 without damage to that apparatus from excessive temperature. There are several reasons, however, for using a multiple quench. Injecting too much water at a given point may cause unevaporated drops to carry over to downstream equipment. Injecting water at two points, as through water supply pipe 4 and water supply pipe 5, permits a lowered temperature between the two points of quench, but one still high enough to aid materially in removing excess residual oily matter from the carbon black. If the total quantity of water injected through pipes 4 and 5 is such as to permit a temperature of about 1000° F. to about 1700° F. entering the heat exchanger 7 through conduit 9 an economic heat recovery may be obtained in heat exchanger 7. In order to insure that material at excessive temperature does not enter the collection system 11 thereby causing damage, a last quench may be injected via pipe 8 downstream of the heat exchanger 7.

The distribution of quench rate between the first and subsequent quenches affects the modulus and the abrasion resistance imparted to rubber compounds by the carbon black. Decreasing the initial quench and thus affording a higher temperature for the residence time to the second quench, may be used to reduce the modulus-producing property of the carbon black significantly. Insufficient initial quenching results in lowered abrasion resistance imparted to the rubber compound by a carbon black so produced. The amount of quenching used to preserve abrasion resistance is well-known, for a given grade of tread grade carbon black, by the practitioners of the art. It is desired to provide means for lowering the modulus-producing property of carbon black at a given structure level, by means other than the reduction of the initial quench, so as not to decrease abrasion resistance in the rubber. As hereinafter set forth, this result is provided by the improved method and apparatus of the present invention.

The off gases entraining the carbon black pass through pipe 10 to collection chamber 11 where a loose, fluffy powder of carbon is separated from the off gases, which are discharged through pipe 12, the carbon being conveyed via line 16 to pelletizing apparatus 14. Water, which enters the pelletizer 14 from supply pipe 15, is mixed with the fluffy carbon black to produce wet pellets which are conveyed by conveyor 17 to dryer 18. Wet pelletizing of carbon black is old art and is disclosed in many patents, such as U.S. Pat. No. 2,861,294. After drying, the pellets are discharged by means of conveyor 20 to storage 21. The dryer is preferably a rotating drum externally fired, with provision for controlling the temperature of the carbon black at various positions in the dryer.

The drying of carbon black pellets must be done with great care. Overheating or undue exposure to oxidizing conditions at dryer temperature reduce not only the modulus-producing properties of the carbon black but also reduce its ability to impart abrasion resistance to a rubber compound. Schemes for controlling dryer temperature are many, see for example U.S. Pat. No. 3,013,785. This patent teaches flowing a portion of the combustion gases from the fires which heat the drum into the discharge end of the dryer and through the dryer countercurrent to the flow of pellets and to be discharged from the feed end of the dryer to purge water vapor therefrom. By contrast, U.S. Pat. No. 3,350,790 teaches the use of combustion gases for purging by flowing such gases cocurrent with the pellets. In both cocurrent and countercurrent flow of combustion gases as purge for the dryer drum, there is considerable protection against excessive and deleterious oxidation of the dried or nearly dried pellets approaching the discharge end thereof because the combustion gases have a low oxygen content. However, in cocurrent flow of the purge gases, the volume of water vapor evaporated from the pellets further dilutes any oxygen flowing over the dried or nearly dried pellets near and at the discharge end of the dryer drum. The mixture of purge gases with pellets is extremely limited. Under these circumstances, the present invention proposes to introduce a small controlled flow of air or other oxidant gas below the surface of the bed of pellets at locations where the pellets are substantially dried. This gas is substantially the only oxidant in contact with the pellets at dryer temperature and remains in contact during a controlled contact time. This contact time is greater as the injection is optionally moved upstream in the bed.

There is no general agreement among those skilled in the carbon black art as to the exact nature of the relatively low temperature reactions of carbon black with oxygen. There has existed a general tacit presumption that the effects of such reactions are negative and to be avoided. It is known that both modulus reduction and reduction in abrasion resistance can occur. Surprisingly, in the present invention, it has been discovered that to an eminently useful degree, these two effects may be separated. It has been discovered that a degree of reaction between carbon black in a dryer and controlled quantities of oxidant gas may cause a lowering of modulus sufficient to provide a quality control means, without adversely affecting abrasion resistance.

The pellet dryer 18 as shown in FIG. 2 includes the rotating drum 55, a substantial portion of which is surrounded and heated by firebox or furnace housing 60. Fuel to heat firebox 60 is supplied to the burners 75 through fuel supply pipe 70. The hot gases are exhausted through stack 100. Wet pellets are delivered into drum 55 through inlet duct 50 which extends through feed end cowl 110. The pellets form a layer 80 in the lower portion of drum 55 and are discharged over dam 115 into discharge end cowl 85. The dried pellets are discharged from cowl 85 through outlet 120.

Purge gas is provided by transfer pipe 105 connecting to stack 100 so that combustion gases are drawn therefrom into the inlet cowl 110. These purge gases are drawn through drum 55 and through line 90 by suction fan 95. In such instance, the purge gases flow cocurrent with the movement of the pellets. Non-oxidant gases may be provided from any other suitable source such as the combustion gases from the reaction vessel.

In order to modify the modulus-producing properties of the carbon black an oxidant gas, such as air, is delivered through line 125 under control of controller 135 to the nozzles 130 which are positioned near the dam 115 so that air is introduced only into contact with pellets that are dry or substantially dry. Also, the supply of air through line 125 may be shut off to allow the dryer 18 to be operated without the modulus reducing means when it is not needed.

In the practice of this invention, the quantity of oxidant gas introduced through supply pipe 125 is carefully controlled. The greater the surface area of a tread grade carbon black, other things being equal, the more sensitive the surface of the carbon black is to possible damaging effects of excessive treatment. Blacks with an oily surface layer are relatively less sensitive to such effects.

carbon black, with plus values if the tested compound is higher in modulus than the reference compound and minus values if it is lower.

In the practice of this invention, it has been found that a carbon black of ASTM Grade N-220 manufactured on apparatus essentially like that disclosed in U.S. Pat. No. 4,106,912, with a volume ratio of combustion air to fuel gas of 15.0, the fuel gas being of 1000 Btu/ft$^3$ heat content and a ratio of 750 scf of combustion air per gallon of feedstock oil, a ratio of 1.05 scf air introduced into the dryer per pound of carbon black dried was effective in reducing modulus without lowering abrasion resistance. Table I gives the results of testing modulus and abrasion resistance of the product made before injection of controlled air into the dryer; Table II shows the results of testing modulus and abrasion resistance of the product of the same set of conditions excepting only that an air injection apparatus according to FIG. 2 carried 1.05 ft$^3$ air into the dryer drum per pound of carbon black dried in the drum. It is noted that the abrasion resistance average remained unchanged while the average 15' modulus compared to the reference in D3192 decreased from 77 to 20; the average 30' modulus compared to the reference in D3192 decreased from 67 to 10; the average 35' modulus compared to the reference in D3191 decreased from 360 to 190; and the average 50' modulus compared to the reference in D3191 decreased from 353 to 287. There is no detectable difference between the respective surface area and structure levels of the two sets of samples.

TABLE I

| N-220 CARBON BLACK MADE WITHOUT DRYER PURGE AIR | | | | |
|---|---|---|---|---|
| Sample Number | 1 | 2 | 3 | Average |
| Dibutyl Phthalate absorption, cc/100g | 117 | 117 | 116 | 117 |
| Iodine number, mg/g | 120 | 121 | 120 | 120 |
| Tint Strength vs. IRB#3 | 117 | 118 | 117 | 117 |
| 300% Modulus vs. IRB#4, 15' Cure, D3192 | +110 | +160 | −40 | 77 |
| 300% Modulus vs. IRB#4, 30' Cure, D3192 | +80 | +30 | +90 | 67 |
| 300% Modulus vs. IRB#4, 35' Cure, D3191 | +350 | +380 | +350 | 360 |
| 300% Modulus vs. IRB#4, 50' Cure, D3191 | +340 | +340 | +380 | 353 |
| Abrasion Index, % of Standard N-220 | 99 | 99 | 100 | 99 |

TABLE II

| N-220 CARBON BLACK WITH DRYER PURGE AIR | | | | |
|---|---|---|---|---|
| Sample Number | 4 | 5 | 6 | Average |
| Dibutyl phthalate absorption, cc/100g | 116 | 117 | 116 | 116 |
| Iodine number, mg/g | 121 | 120 | 121 | 121 |
| Tint Strength, vs. IRB#3 | 116 | 116 | 116 | 116 |
| 300% Modulus vs. IRB#4, 15' Cure, D3192 | +30 | −10 | +40 | 20 |
| 300% Modulus vs. IRB#4, 30' Cure, D3192 | −20 | +10 | +40 | 10 |
| 300% Modulus vs. IRB#4, 35' Cure, D3191 | +150 | +170 | +250 | 190 |
| 300% Modulus vs. IRB#4, 50' Cure, D3191 | +260 | +210 | +390 | 287 |
| Abrasion Index, % of Standard N-220 | 99 | 98 | 99 | 99 |

Two well-known and accepted methods for testing the modulus of a rubber compound containing a specific carbon black are published by ASTM as Method D3191 and D3192. It is common practice to compare the modulus of the test compound by difference from the modulus of a like compound containing a standard reference In tests of the method of this invention, to lower the modulus of a black of N-351 grade, the date of Tables III and IV were obtained. The dryer purge air was injected at a rage of 0.75 cubic feet per pound of carbon black.

TABLE III

| N-351 CARBON BLACK MADE WITHOUT DRYER PURGE AIR TESTED IN STYRENE-BUTADIENE RUBBER 300% MODULUS, DIFFERENCE FROM STANDARD | | | | | | | | | | |
|---|---|---|---|---|---|---|---|---|---|---|
| Cure | 1 | 2 | 3 | 4 | 5 | 6 | 7 | 8 | 9 | Average |
| 25' | +420 | +690 | +630 | +470 | +600 | +610 | +490 | +400 | +450 | +529 |
| 50' | +350 | +440 | +580 | +430 | +560 | +470 | +500 | +420 | +310 | +412 |

TABLE III-continued

N-351 CARBON BLACK MADE WITHOUT DRYER PURGE AIR
TESTED IN STYRENE-BUTADIENE RUBBER
300% MODULUS, DIFFERENCE FROM STANDARD

| Cure | 1 | 2 | 3 | 4 | 5 | 6 | 7 | 8 | 9 | Average |
|---|---|---|---|---|---|---|---|---|---|---|
| 100' | +390 | +520 | +530 | +380 | +496 | +400 | +430 | +390 | +270 | +422 |

TABLE IV

N-351 CARBON BLACK MADE 0.75 CUBIC FEET OF
DRYER AIR PER POUND OF CARBON BLACK
300% MODULUS, DIFFERENCE FROM STANDARD
TESTED IN SBR RUBBER

| Cure | 1 | 2 | 3 | 4 | 5 | 6 | Average |
|---|---|---|---|---|---|---|---|
| 25' | +220 | +310 | +360 | +440 | +340 | +380 | +342 |
| 50' | +260 | +270 | +360 | +290 | +390 | +330 | +317 |
| 100' | +260 | +300 | +280 | +360 | +390 | +280 | +312 |

In other plant tests, as much as 1.95 cubic feet of purge air per pound of N-220 carbon black effected the desired modulus change without deleterious effects.

What is claimed is:

1. The method of producing carbon black including the steps of
    burning a hydrocarbon fuel to produce a stream of hot gases at carbon black-forming temperature,
    introducing a hydrocarbon feedstock into said hot gases to produce carbon black and by-product gases therefrom,
    quenching the resulting hot gases and carbon black to a temperature permitting collection of the carbon black,
    collecting the carbon black,
    pelletizing the carbon black with water,
    drying the wet carbon black pellets in a heated rotating drum with combustion gases flowing cocurrently with the movement of the pellets through the drum, and injecting below the surface of the bed of pellets, proximate the discharge end of the dryer, a controlled quantity of oxidant gas sufficient to lower the modulus-producing properties of the carbon black but insufficient to reduce its property of imparting abrasion resistance to rubber compounds.

2. The method according to claim 1, wherein the oxidant gas injected into the pellets is air.

3. The process of claim 2, wherein air is injected at a rate between 0.75 to 1.95 standard cubic feet per pound of carbon black.

4. In combination with a method of producing carbon black, the method of drying wet carbon black pellets including the steps of
    drying the wet carbon black pellets in a heated rotating drum with heated purge gases flowing cocurrently therethrough with the pellets, and
    injecting an amount of oxidant gas below the surface of the bed of pellets at a location in the drum where the pellets are substantially dried which amount is sufficient to lower the modulus producing properties of the carbon black without reducing the abrasive resistance of rubber compounds including such pellets.

5. The method according to claim 4, wherein the injected oxidant gas is air.

6. The method according to claim 5, wherein the rate of air injected is from 0.75 to 1.95 standard cubic feet per pound of carbon black.

* * * * *